United States Patent
Chan et al.

(10) Patent No.: US 9,056,686 B2
(45) Date of Patent: Jun. 16, 2015

(54) AIRCRAFT TUG VEHICLE

(71) Applicants: Anthony Y. Chan, Sierra Madre, CA (US); Tracy J. Haeggstrom, Orange, CA (US); Grant D. Garfield, Folsom, CA (US); Nashatar A. Gill, Riverside, CA (US)

(72) Inventors: Anthony Y. Chan, Sierra Madre, CA (US); Tracy J. Haeggstrom, Orange, CA (US); Grant D. Garfield, Folsom, CA (US); Nashatar A. Gill, Riverside, CA (US)

( * ) Notice: Subject to any disclaimer, the term of this patent is extended or adjusted under 35 U.S.C. 154(b) by 16 days.

(21) Appl. No.: 13/966,044

(22) Filed: Aug. 13, 2013

(65) Prior Publication Data

US 2014/0048342 A1  Feb. 20, 2014

Related U.S. Application Data

(60) Provisional application No. 61/742,549, filed on Aug. 14, 2012.

(51) Int. Cl.
    *B62D 55/00*  (2006.01)
    *B64F 1/10*   (2006.01)
    *B64F 1/22*   (2006.01)

(52) U.S. Cl.
    CPC . *B64F 1/10* (2013.01); *B64F 1/227* (2013.01); *B64F 1/228* (2013.01)

(58) Field of Classification Search
    CPC .................................. B64F 1/22; B64F 1/227
    USPC ...................................................... 180/14.7
    See application file for complete search history.

(56) References Cited

U.S. PATENT DOCUMENTS

| | | | | |
|---|---|---|---|---|
| 2,966,222 | A | * | 12/1960 | Lambert, Jr .................... 254/2 R |
| 3,761,040 | A | | 9/1973 | Cummins |
| 3,937,290 | A | * | 2/1976 | Benning ........................ 180/14.7 |
| 4,036,384 | A | * | 7/1977 | Johnson ......................... 414/430 |
| 4,225,279 | A | * | 9/1980 | Boyer ............................ 414/428 |
| 4,470,564 | A | | 9/1984 | Johnson |
| 4,655,670 | A | * | 4/1987 | Hogberg et al. .............. 414/458 |
| 4,950,121 | A | * | 8/1990 | Meyer et al. .................. 414/428 |
| 5,151,004 | A | | 9/1992 | Johnson |
| 5,261,778 | A | | 11/1993 | Zschoche |
| 5,302,075 | A | | 4/1994 | Zschoche |
| 6,305,484 | B1 | | 10/2001 | Leblanc |
| 6,739,822 | B2 | * | 5/2004 | Johansson ..................... 414/427 |
| 8,181,725 | B2 | | 5/2012 | Andres |
| 8,455,792 | B2 | * | 6/2013 | Kim et al. ................ 219/121.75 |
| 2009/0104009 | A1 | * | 4/2009 | Hamman ...................... 414/428 |
| 2012/0215393 | A1 | | 8/2012 | Schiedegger |

FOREIGN PATENT DOCUMENTS

GB    1382265       1/1975
WO    2008000257 A1  1/2008

* cited by examiner

*Primary Examiner* — Tony Winner
(74) *Attorney, Agent, or Firm* — Edwin Tarver

(57) ABSTRACT

An improved aircraft towing vehicle includes a base plate, a controller and two drive motors supported by two track assemblies. A pivoting wheel constraint mechanism rests on the base plate and includes a front roller mount, a rear roller mount and a linkage connecting the front roller mount and the rear roller mount. When the rear roller mount is pushed or otherwise urged backward, the linkage causes the front roller mount to pivot upward to confine an aircraft wheel on the base plate. A latch keep is also connected to the base plate for holding the rear roller mount in the backward position and locking the wheel constraining mechanism for moving an aircraft.

23 Claims, 4 Drawing Sheets

AIRCRAFT TUG VEHICLE

This application claims the benefit of the filing date of provisional application No. 61/742,549, filed on Aug. 14, 2012.

BACKGROUND

Aircraft towing vehicles are known in the art, including towing vehicles for small aircraft. Typical small aircraft towing vehicles are inconvenient and cumbersome to use, as they frequently require attachment to an aircraft wheel axle, attachment to another vehicle using a tow bar, or they must be personally pulled by a handle after connection to an aircraft, limiting the weight that may be towed by a single user.

Motorized aircraft towing vehicles have been developed in the art to move small aircraft which may be too heavy to move personally. These vehicles avoid the need for attaching to a separately powered vehicle, and comprise a motorized apparatus typically having a handle with an actuator, similar to a motorized pallet jack for activating the motor and steering the vehicle. Currently available motorized apparatus are also disfavored since they frequently require a detailed attachment mechanism, and in and event, require a user to stand alongside and move in tandem with the vehicle, which may be inconvenient.

Based on the current need in the art for an aircraft towing vehicle that avoids the problems associated with previously developed towing vehicles, it is an object of the present invention to provide an aircraft towing vehicle which is able to move under, lock and capture the nose wheel of an aircraft, which is able to move independently by remote control, and which is also able to automatically release the aircraft wheel after moving to a desired location. These and other objects are discussed in the following summary, description and claims.

SUMMARY

An improved aircraft towing vehicle is disclosed for facilitating the movement of small to medium size aircraft without relying on the aircraft's own power. The aircraft towing vehicle may be principally used for moving an aircraft in and out of an enclosed hanger, into a parking location, or within a garage or hanger. Additional uses for the vehicle may include any situation where an aircraft must be moved without operating under its own power. Additionally, the towing vehicle is not limited to aircraft, but may be employed to tow or move a variety of objects capable of resting on and being held by the vehicle.

An aircraft towing vehicle, includes a base plate, at least one track assembly supporting the base plate, at least one drive motor connected to the base plate and the track assembly, a controller; and a pivoting wheel constraint mechanism. The wheel constraint mechanism includes a front roller mount, a rear roller mount and a linkage connecting the front roller mount and the rear roller mount so that when the rear roller mount is pushed or otherwise urged forward, the front roller mount pivots upward to confine an aircraft wheel on the base plate.

Preferably the aircraft towing vehicle includes an enclosure surrounding and protecting the drive motor and controller. The controller may be operated by a remote control unit apart from the aircraft towing vehicle. The enclosure, drive motors and controller may be installed along one side of the base plate, between the two track assemblies. In this manner, the opposing track assemblies support opposite sides of the base plate and are symmetrical. In addition to the enclosure and track assemblies, a pivoting wheel constraint mechanism is also affixed to the base plate.

Each track assembly includes a center rail, which is connected to the base plate. One or more sprockets are connected to the center rail. Preferably, a series of sprockets is used for each track assembly, including installed at each extreme end of the track assembly. The sprockets are designed to engage and move a tread pad relative to the center rail, thereby imparting movement to the track assembly.

In a preferred embodiment, a series of tread pads are linked together to form a continuous tread pad assembly encircling the center rail. In this manner, each tread pad may be made of a resilient flat material yet still allow the tread pad assembly to rotate around the center rail. In various embodiments the tread pads may be linked together using metal pins, chain links, link fasteners, a combination thereof, or similar hinging mechanisms. Additionally each sprocket may remain engaged in the tread pad assembly during rotation of the sprocket and movement of the tread pad assembly.

The vehicle may include two drive motors, each connected to a track assembly for independently rotating the sprockets and providing differential movement. In addition, each of the drive motors may engage a gear reducer coupled to the drive motor for driving sprockets on the track assembly, and allowing the vehicle to tow a heavy aircraft or other object using minimal power. The independent rotation of the tread assemblies, in conjunction with the gear reducers facilitates forward, backward, and right and left turning movements of the vehicle. Additionally, the controller preferably controls the speed and direction of the drive motors.

The wheel constraint mechanism on the base plate includes two opposing linkage bars, each connecting the front roller mount to the rear roller mount. The front roller mount is connected to front pivot blocks attached to the base plate, and the rear roller mount is connected to rear pivot blocks attached to the base plate. When an aircraft wheel is urged onto the base plate, it eventually engages the rear roller mount, pushing it backward and pivoting it on the rear pivot blocks. Preferably a latch keep is also connected to the base plate for holding the rear roller mount in the forward position and locking the wheel constraining mechanism.

Although the aircraft towing vehicle may be used to tow a variety of objects, the towing of an aircraft is discussed as exemplary. To tow an aircraft, a user guides the aircraft towing vehicle to approach the front wheel of the aircraft. In the alternative, another wheel such as a rear wheel may be towed as would be the case with a "tail dragger" type airplane. Preferably, prior to or during this action, the rear roller mount of the aircraft towing vehicle is lowered. The aircraft towing vehicle is oriented relative to the front wheel of the aircraft, such that the front roller mount encounters the front wheel of the aircraft, and the aircraft towing vehicle is driven under the front wheel of the aircraft such that it rolls onto the base plate between the linkage bars connecting the front roller mount and rear roller mount.

As the aircraft wheel travels forward, it eventually engages the rear roller mount. Pressure on the rear roller mount causes it to move backward, toward the enclosure, thereby pulling up the front roller mount by the linkage bars and enclosing the aircraft wheel. Once in a fully reclined position, the rear roller mount may be held in place by a latch keep, effectively locking the front roller mount and rear roller mount in position. Once locked in position, the aircraft may be towed by the aircraft towing vehicle to a desired location.

After arriving in the desired location, the latch keep may be operated to unlock the wheel constraining mechanism, which allows the rear roller mount to pivot forward and the front roller mount to pivot downward as the aircraft wheel rolls off the aircraft towing vehicle. A user may then drive the aircraft towing vehicle to another desired location for moving another object or for storage. Preferably, control of the aircraft towing vehicle is accomplished by remote control, including a remote controller with directional capability.

REFERENCE NUMBERS

10. Aircraft Tow Vehicle
12. Base Plate
14. Track Assembly
16. Enclosure
18. Front Roller Mount
20. Rear Roller Mount
22. Remote Controller
24. Center Rail
26. Sprocket
28. Center Axle
30. Tread Pad
32. Link Pin
34. Chain Link
36. Link Fastener
38. Tread Assembly
40. Electric Motors
42. Gear Reducers
44. Electronic Controller
46. Linkage Bars
48. Front Pivot Blocks
50. Rear Pivot Blocks
52. Latch Keep
54. Latch Bar
56. Power Source

DESCRIPTION

Figure 1:
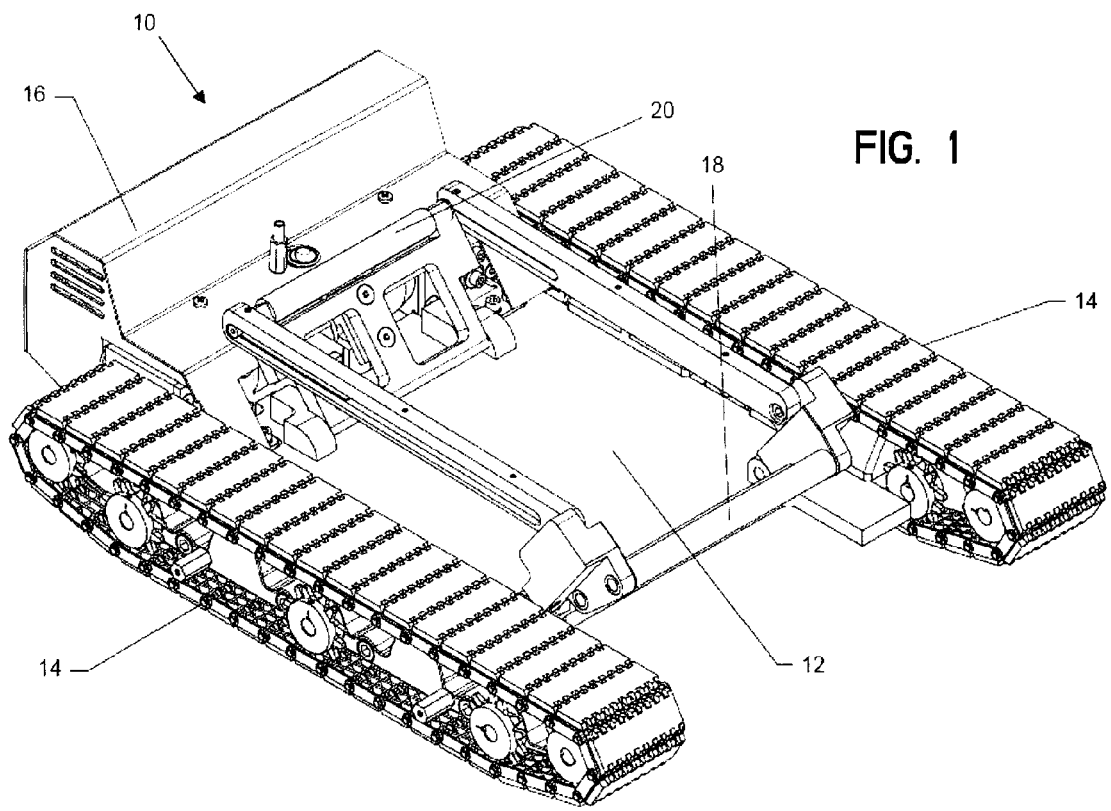
FIG. 1 is a perspective view of an aircraft towing vehicle with a wheel constraining mechanism in a locked position.

Referring to FIG. 1, an aircraft towing vehicle 10 includes a base plate 12 and at least one track assembly 14. Preferably, right and left track assemblies 14 are attached on opposite sides of the base plate 12 for support and to create a frame for the aircraft towing vehicle 10. An enclosure 16 houses a controller 44 (not shown) and motor 40 (not shown) assemblies for driving the track assemblies 14. The enclosure 16 may be is connected to the base plate 12 directly, or connected to the controller 44 and motor 40 assemblies it houses.

Figure 2:
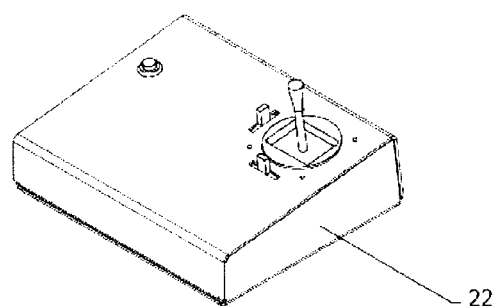
FIG. 2 is a perspective view of a remote controller.

A front roller mount 18 and rear roller mount 20 for engaging and constraining an aircraft wheel (not shown) are located on the base plate 12. Referring to FIG. 2, the aircraft towing vehicle 10 is preferably guided into position using a remote controller 22. The remote controller 22 may include joystick controls for moving the aircraft towing vehicle 10 forward and backward, left and right and for turning on an axis.

Figure 3:
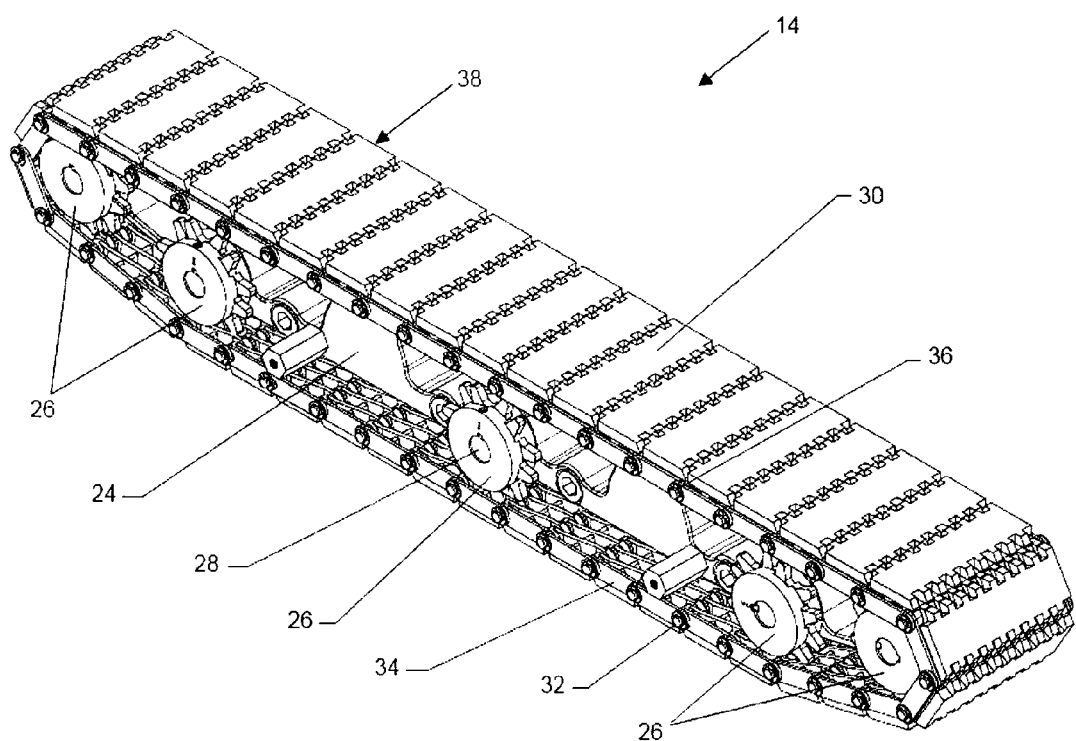
FIG. 3 is a perspective view of a track assembly.

Referring to FIG. 3, the track assemblies 14 are preferably right and left track assemblies 14 and are symmetrical. In this manner, the track assemblies 14 each have the same parts assembled into a right or left configuration. Each track assembly 14 comprises a center rail 24, which is typically a non-moving part and connected to the base plate 12. Several sprockets 26 are designed to rotate around a center axle 28 connected to the center rail 24. Each sprocket 26 engages a tread pad 30 and may remain engaged as the sprocket 26 rotates, depending on the sprocket's 26 location. There are several tread pads 30 linked together at each end by a link pin 32, a metal chain link 34 and a link fastener 36 thereby creating a continuous tread assembly 38. Rotation of the sprockets 26 and the movement of the tread assembly 38 facilitate the movement of the aircraft towing vehicle 10.

Figure 4:
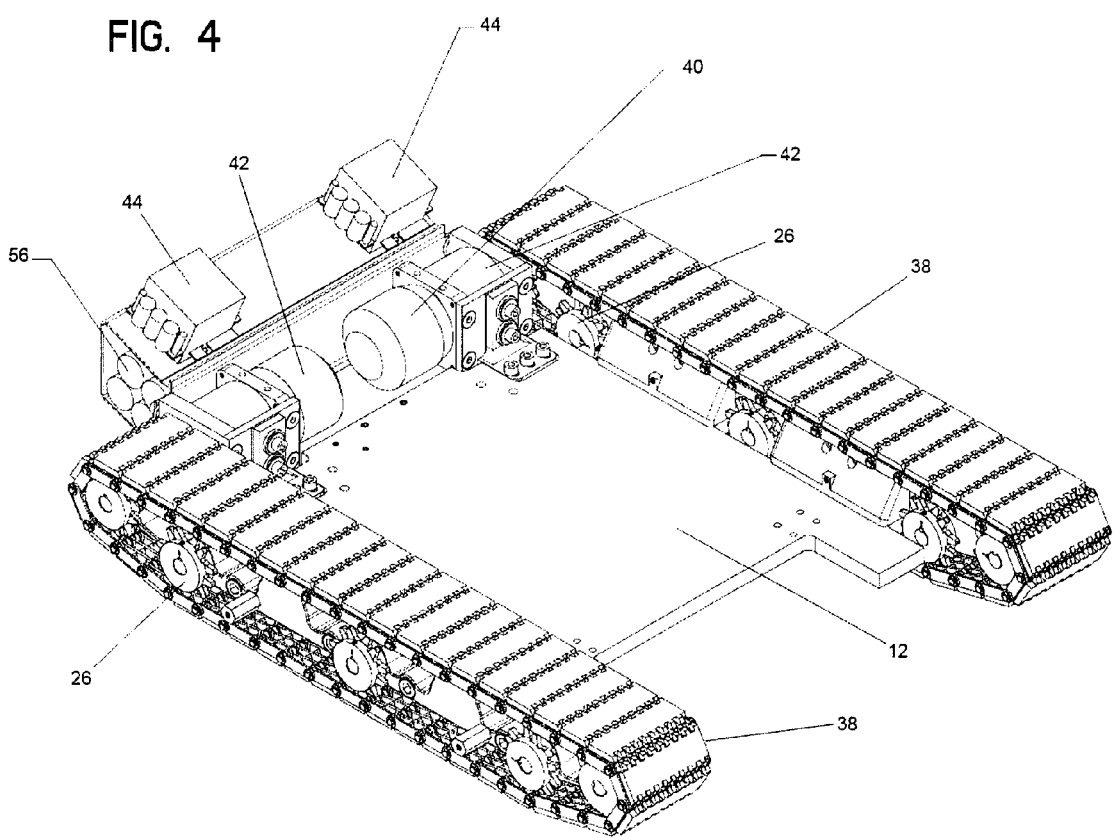
FIG. 4 is a perspective view of an aircraft towing vehicle with the wheel constraining mechanism and enclosure removed.

Referring to FIG. 4, the sprockets 26 are rotated by electric motors 40 and gear reducers 42. As shown, an electric motor 40 and a gear reducer 42 is connected to each track assembly 38, thereby permitting the tread assemblies 38 to independently rotate. In this manner, independent rotation of the tread assemblies 38 facilitating forward, backward, right and left turning movements, and turning on an axis. Each electric motor 40 is controlled by an electronic controller 44 to set the speed and direction of the electric motor 40.

Figure 5:
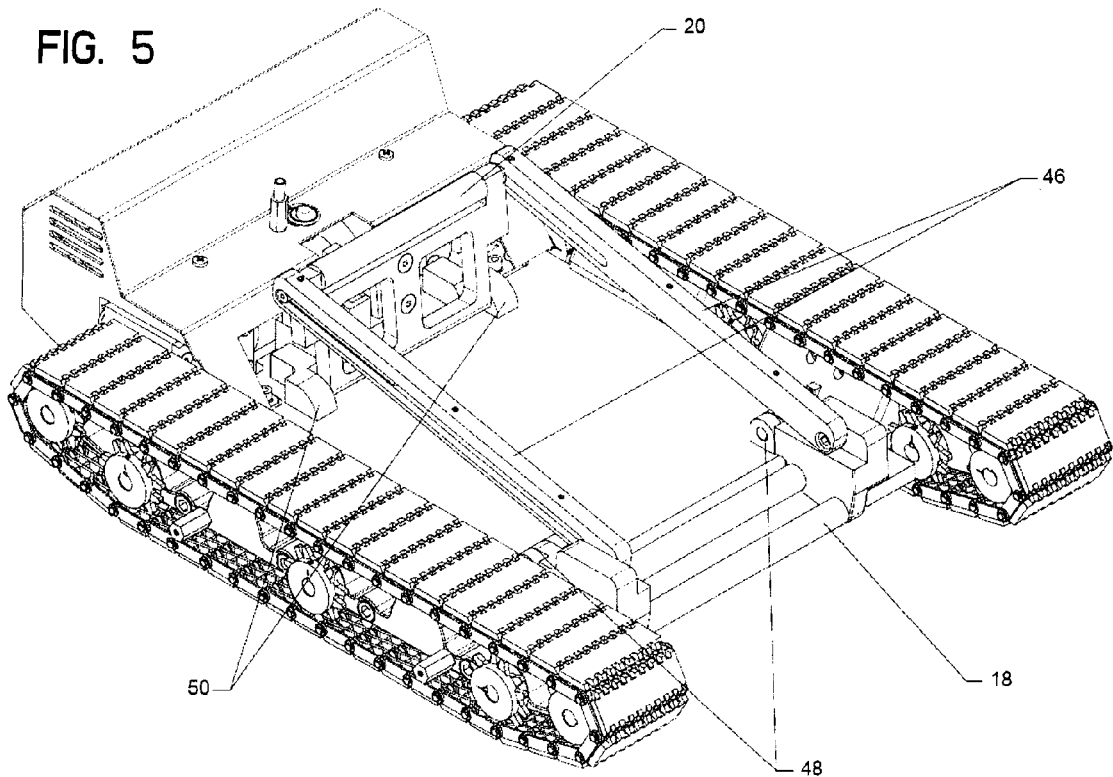
FIG. 5 is a perspective view of an aircraft towing vehicle with a wheel constraining mechanism in an unlocked position.
Figure 6:
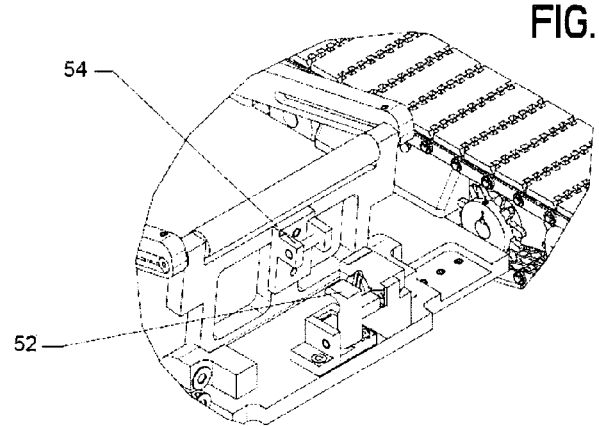
FIG. 6 is a perspective view of a locking mechanism.

Referring to FIG. 5, a wheel constraint mechanism comprises a front roller mount 18, a rear roller mount 20, two connecting linkage bars 46, front pivot blocks 48, and rear pivot blocks 50. Due to the connected nature of the front roller mount 18 and rear roller mount 20 by the linkage bars 46, when the rear roller mount 20 is urged backward by an aircraft wheel (not shown), pivoting on the rear pivot blocks 50, the front roller mount 18 pivots on the front pivot blocks 48, causing the front roller mount 18 to pivot upward, capturing the aircraft wheel. Referring to FIG. 6, a latch keep 52 may engage a latch bar 54 connected adjacent the rear roller mount 20 to lock the front roller mount 18 in position as an aircraft (not shown) is moved.

In order to use the aircraft towing vehicle 10, the aircraft towing vehicle 10 is maneuvered in front of an aircraft wheel (not shown) with the front roller mount 18 in the downward position as shown in FIG. 5. The aircraft towing vehicle 10 is driven under the aircraft wheel thereby forcing the tire up and over the front roller mount 18 and further on the base plate 12 between the two connecting linkage bars 46. The aircraft towing vehicle 10 continues to move under the aircraft wheel until the aircraft wheel comes into contact with the rear roller mount 20.

When the aircraft wheel contacts the rear roller mount 20 it is forced to pivot about the center pivot axis of the rear pivot blocks 50 and pulls the two connecting linkage bars 46 which pull on the front roller mount 18, causing the front roller mount 18 to pivot about the axis of the front pivot blocks 48. This motion raises the front roller mount 18 to secure the aircraft wheel between the front roller mount 18 and the rear roller mount 20. Once the aircraft wheel is secure between the front roller mount 18 and rear roller mount 20, the latch keep 52 articulates to retain the latch bar 54, preventing the front roller mount 18 and rear roller mount 20 from moving. The aircraft towing vehicle can then be moved to facilitate the movement of the aircraft. Once the aircraft is in a desired location, disengaging the latch keep 52 from the latch bar 54 allows the aircraft towing vehicle to roll out from under the aircraft.

The foregoing description of the preferred embodiment of the invention is sufficient in detail to enable one skilled in the art to make and use the invention. It is understood, however, that the detail of the preferred embodiment presented is not intended to limit the scope of the invention, in as much as equivalents thereof and other modifications which come within the scope of the invention as defined by the claims will become apparent to those skilled in the art upon reading this specification.

What is claimed is:

1. An aircraft towing vehicle, comprising:
   a base plate;
   at least two track assemblies supporting the base plate;
   at least two drive motors, each individual drive motor connected to an individual track assembly and to the base plate;
   a controller; and
   a pivoting wheel constraint mechanism comprising a front roller mount, a rear roller mount and a linkage connecting the front roller mount and the rear roller mount so that when the rear roller mount is urged forward, the front roller mount pivots upward, thereby confining an aircraft wheel on the base plate.

2. The vehicle of claim 1 further comprising an enclosure surrounding the drive motor and the controller.

3. The vehicle of claim 1 wherein the pivoting wheel constraint mechanism is affixed to the base plate.

4. The vehicle of claim 1 further comprising a remote control for operating the controller.

5. The vehicle of claim 1 wherein the at least one track assembly further comprises opposing track assemblies supporting opposite sides of the base plate.

6. The vehicle of claim 1 wherein the track assembly comprises a center rail connected to the base plate.

7. The Vehicle of claim 1 wherein the track assembly comprises sprockets connected to a center rail, and a tread pad engaged by the sprockets.

8. The vehicle of claim 7 wherein the track assembly comprises a series of tread pads linked together forming a continuous tread pad assembly encircling the center rail.

9. The vehicle of claim 8 wherein the tread pads are linked together using metal pins.

10. The vehicle of claim 8 wherein the tread pads are linked together using chain links.

11. The vehicle of claim 8 wherein the tread pads are linked together using link fasteners.

12. The vehicle of claim 1 wherein the at least one motor further comprises two drive motors, each connected to a track assembly for providing differential movement.

13. The vehicle of claim 1 wherein the rear roller mount is connected to rear pivot blocks attached to the base plate.

14. The vehicle of claim 1 further comprising a latch keep connected to the base plate for locking the wheel constraining mechanism.

15. The vehicle of claim 1 further comprising a gear reducer coupled to the at least one drive motors for driving sprockets on the track assembly.

16. The vehicle of claim 1 wherein the wheel constraint mechanism comprises two opposing linkage bars, each connecting the front roller mount to the rear roller mount.

17. The vehicle of claim 1 wherein the front roller mount is connected to front pivot blocks attached to the base plate.

18. A vehicle for towing an aircraft, comprising:
    a base plate supporting a controller and two drive motors;
    an enclosure housing the controller and drive motors;
    an opposing set of elongated track assemblies supporting the base plate, the track assemblies further comprising a series of interconnected track pads forming a continuous tread pad assembly; and
    a pivoting wheel constraint mechanism comprising a front roller mount, a rear roller mount and a linkage connecting the front roller mount and the rear roller mount so that when the rear roller mount is urged forward, the front roller mount pivots upward, thereby confining an aircraft wheel on the base plate.

19. A method of towing an aircraft when on the ground, comprising the steps of:
    approaching a wheel of the aircraft with an aircraft towing vehicle;
    lowering a rear roller mount on the aircraft towing vehicle;
    orienting the aircraft towing vehicle relative to the wheel;
    driving the aircraft towing vehicle under the aircraft wheel;
    engaging a front roller mount with the aircraft wheel until the from roller mount pivots forward, causing the rear roller mount to pivot upward;
    locking the front roller mount and the rear roller mount in position;
    towing the aircraft; and
    steering the aircraft towing vehicle by independent differential rotation of track assemblies of the aircraft towing vehicle.

20. The method of claim 19 further comprising the step of unlocking the front roller mount and the rear roller mount.

21. The method of claim 19 further comprising the step of pivoting the front roller mount downward.

22. The method of claim 19 further comprising the step of rolling the aircraft wheel off the aircraft towing vehicle.

23. The method of claim 19 farther comprising the step of operating the aircraft towing vehicle with a remote controller.

* * * * *